(12) United States Patent
Iijima et al.

(10) Patent No.: US 10,316,200 B2
(45) Date of Patent: Jun. 11, 2019

(54) METHOD FOR MANUFACTURING A CATIONIC ELECTRODEPOSITION COATING COMPOSITION

(71) Applicant: KANSAI PAINT CO., LTD., Hyogo (JP)

(72) Inventors: Hideki Iijima, Kanagawa (JP); Toshiyuki Hanaoka, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 142 days.

(21) Appl. No.: 15/426,128

(22) Filed: Feb. 7, 2017

(65) Prior Publication Data
US 2017/0226354 A1    Aug. 10, 2017

Related U.S. Application Data

(60) Provisional application No. 62/295,764, filed on Feb. 16, 2016.

(30) Foreign Application Priority Data

Feb. 8, 2016 (JP) ................................. 2016-021879

(51) Int. Cl.
| | | |
|---|---|---|
| C09D 5/44 | (2006.01) | |
| C25D 13/04 | (2006.01) | |
| C25D 13/16 | (2006.01) | |

(52) U.S. Cl.
CPC ......... C09D 5/4453 (2013.01); C09D 5/4438 (2013.01); C09D 5/4457 (2013.01); C25D 13/04 (2013.01); C25D 13/16 (2013.01)

(58) Field of Classification Search
None
See application file for complete search history.

(56) References Cited

U.S. PATENT DOCUMENTS

| | | | |
|---|---|---|---|
| 5,124,399 A | 6/1992 | Yabuta et al. | |
| 5,427,661 A | 6/1995 | Geist et al. | |
| 6,080,296 A * | 6/2000 | Lieverz ................. | B05D 7/577 204/486 |

(Continued)

FOREIGN PATENT DOCUMENTS

| | | |
|---|---|---|
| JP | 56-120758 | 9/1981 |
| JP | 2-502291 | 7/1990 |

(Continued)

*Primary Examiner* — Kishor Mayekar
(74) *Attorney, Agent, or Firm* — Wenderoth, Lind & Ponack, L.L.P.

(57) ABSTRACT

An object of the present invention is to find a method for producing a cationic electrodeposition coating composition that is excellent in storage stability, low-temperature curability, finished appearance, and corrosion resistance, and to provide a coated article excellent in these properties. The method for producing a cationic electrodeposition coating composition comprises mixing three components, i.e., an aqueous dispersion of an amino group-containing epoxy resin (A), an aqueous dispersion of a blocked polyisocyanate compound (B), and a pigment dispersion paste (C), wherein the aqueous dispersion of a blocked polyisocyanate compound (B) comprises a blocked polyisocyanate compound (b) and an emulsifier.

8 Claims, 1 Drawing Sheet

(56) References Cited

U.S. PATENT DOCUMENTS

2005/0279633 A1* 12/2005 Toi ................... C08G 18/283
                                                              204/502
2015/0275030 A1    10/2015 Hara et al.

FOREIGN PATENT DOCUMENTS

| JP | 4-39322     | 2/1992  |
|----|-------------|---------|
| JP | 7-300698    | 11/1995 |
| JP | 8-81644     | 3/1996  |
| JP | 10-120947   | 5/1998  |
| JP | 2002-126616 | 5/2002  |
| JP | 2004-27255  | 1/2004  |
| JP | 2006-2003   | 1/2006  |
| JP | 2015-187194 | 10/2015 |

* cited by examiner

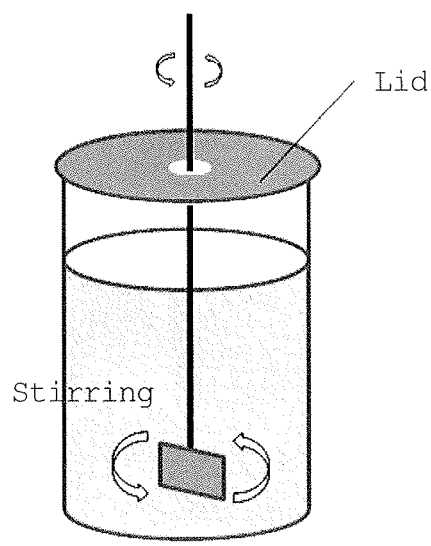

METHOD FOR MANUFACTURING A CATIONIC ELECTRODEPOSITION COATING COMPOSITION

TECHNICAL FIELD

The present invention relates to a method for producing a cationic electrodeposition coating composition that is excellent in storage stability and low-temperature curability, as well as finished appearance and corrosion resistance of the coating film.

BACKGROUND ART

Cationic electrodeposition coating compositions have excellent application workability and form a coating film with excellent corrosion resistance. They have thus been widely used for, for example, automobile parts, electrical equipment parts, and other industrial machinery, which are required to have such properties.

In general, cationic electrodeposition coating compositions are provided in the form of a mixture of two components, i.e., a resin emulsion component in which resin components comprising a cationic resin (e.g., an amino group-containing epoxy resin) and a curing agent (also called "crosslinking agent"; e.g., a blocked polyisocyanate compound) are mixed and dispersed in an aqueous medium, and a pigment dispersion paste component containing a pigment dispersed with a resin for pigment dispersion. Such a coating composition is used for a coating bath, and a current is applied using a substrate as a cathode and the counter electrode as anode to form a deposited coating film on the substrate. The deposited coating film is heated to form a crosslink-cured coating film.

The heating temperature in the coating film formation described above is commonly higher than 160° C. However, to reduce energy costs, there is demand for performing heating at low temperature (80 to 160° C., and preferably 80 to 130° C.). This is called "low-temperature baking."

The low-temperature baking is commonly performed using a low-temperature curable blocked polyisocyanate compound as a curing agent. For example, PTL 1 (Claim 3) discloses that low-temperature curing is performed using an oxime-blocked isocyanate-containing cationic electrodeposition coating composition. PTL 2 (Claim 7) discloses a low-temperature-baking electrodeposition coating composition that is baked at a temperature of 100 to 160° C. and that oxime-blocked and lactam-blocked polyisocyanate compounds can dissociate (undergo a reaction) at relatively low temperature. PTL 3 discloses that a self-crosslinking resin containing a specific blocked isocyanate group can be cured at a low temperature of 120° C. or less and can also be used as a cationic electrodeposition coating composition.

However, electrodeposition coating compositions whose reactivity at low temperature is enhanced may have unsatisfactory long-term storage stability (bath stability), resulting in, for example, poor finished appearance and corrosion resistance of the coating film.

PTL 4 discloses a method for forming a coating film by low-temperature baking, comprising performing electrodeposition coating using a base resin (an amine-added epoxy resin), performing electrodeposition coating using an aqueous dispersion of a blocked polyisocyanate curing agent to which water dispersibility is imparted, and drying the resulting coating film by heating at 60 to 150° C. Since coating compositions and coating are separately used for the base resin and the curing agent, the storage stability (bath stability) of the coating compositions is improved. However, the curing agent may not be homogeneously present in the coating film, resulting in, for example, poor corrosion resistance. In addition, since this method requires additional coating and washing steps, it is necessary to provide additional equipment.

CITATION LIST

Patent Literature

PTL 1: JPH10-120947A
PTL 2: JPH07-300698A
PTL 3: JPH04-039322A
PTL 4: JP2004-027255A

SUMMARY OF INVENTION

Technical Problem

An object of the present invention is to provide a method for producing a cationic electrodeposition coating composition that is excellent in storage stability and low-temperature curability, as well as finished appearance and corrosion resistance of the coating film.

Solution to Problem

The present inventors conducted extensive research to achieve the above object, and found that the object can be achieved by a method for producing a cationic electrodeposition coating composition, wherein three components, i.e., a low-temperature curable blocked polyisocyanate compound, an amino group-containing epoxy resin, and a pigment dispersion paste, are separately dispersed in water, and the dispersions are mixed. The present invention has been thus accomplished.

More specifically, the present invention provides the following methods for producing a cationic electrodeposition coating composition and coated article obtained by applying the cationic electrodeposition coating composition to a substrate by electrodeposition.

Item 1. A method for producing a cationic electrodeposition coating composition, comprising mixing three components, i.e., an aqueous dispersion of an amino group-containing epoxy resin (A), an aqueous dispersion of a blocked polyisocyanate compound (B), and a pigment dispersion paste (C).

Item 2. The method for producing a cationic electrodeposition coating composition according to Item 1, wherein the aqueous dispersion of a blocked polyisocyanate compound (B) comprises a blocked polyisocyanate compound (b) and an emulsifier, and the emulsifier is present in an amount of 0.01 to 40 mass % based on the resin solids content of the aqueous dispersion (B).

Item 3. The method for producing a cationic electrodeposition coating composition according to Item 2, wherein the emulsifier is a cationic emulsifier.

Item 4. The method for producing a cationic electrodeposition coating composition according to Item 2 or 3, wherein the aqueous dispersion of a blocked polyisocyanate compound (B) comprises an emulsifier and a blocked polyisocyanate compound (b) obtained by reacting an isocyanate compound (b-1) with a blocking agent (b-2), and the active hydrogen group content in the emulsifier is 50 mol % or less based on the isocyanate group content in the polyisocyanate compound (b-1).

Item 5. The method for producing a cationic electrodeposition coating composition according to any one of Items 1 to 4, wherein the aqueous dispersion of a blocked polyisocyanate compound (B) comprises a blocked polyisocyanate compound (b) obtained by reacting an isocyanate compound (b-1) with a blocking agent (b-2), and the blocking agent (b-2) is at least one member selected from the group consisting of pyrazole compounds, active methylene compounds, oxime compounds, phenol compounds, lactam compounds, and alcohol compounds.

Item 6. The method for producing a cationic electrodeposition coating composition according to any one of Items 1 to 5, wherein the gel fraction measured under the following conditions using a cationic electrodeposition coating composition obtained by the method is 90% or more, Gel Fraction Measurement Conditions:

The cationic electrodeposition coating composition is applied to a metal plate by electrodeposition so as to provide a film thickness after cure of 20 μm, and the resulting film is heated at 120° C. for 30 minutes; the mass of the obtained cured coating film (Wa) is measured; the cured coating film is immersed in acetone and is heated under reflux for 5 hours; after the immersion in acetone, the coating film is dried at 110° C. for 1 hour, and the mass of the coating film (Wb) is measured; and the proportion (%) of the remaining undissolved coating film is determined according to the following equation and is referred to as "gel fraction":

Gel fraction (%) $(Wb/Wa) \times 100$.

Item 7. A method for forming a coating film, comprising applying a cationic electrodeposition coating composition obtained by the method according to any one of Items 1 to 6 to a metal substrate by electrodeposition and performing baking at a temperature of 160° C. or less.

Item 8. A method for forming a coating film, comprising applying a cationic electrodeposition coating composition obtained by the method according to any one of Items 1 to 6 to a metal substrate by electrodeposition and performing baking at a temperature of 80 to 130° C.

Advantageous Effects of Invention

The cationic electrodeposition coating composition obtained by the production method of the present invention has excellent coating composition stability (bath stability), and even if a low-temperature curable blocked polyisocyanate compound is used as a curing agent, the resulting coating film is excellent in finished appearance and corrosion resistance.

More specifically, an automotive body coated with the coating composition obtained by the method of the present invention has a coating film with excellent finished appearance and is less corroded or deteriorated even when the car is driven for a long period of time in an environment in which snow-melting salt has been spread. Moreover, the cationic coating composition obtained by the production method of the present invention has excellent storage stability over a long period of time.

BRIEF DESCRIPTION OF DRAWINGS

FIG. 1 shows an overview of the storage test in the Examples of the present application.

DESCRIPTION OF EMBODIMENTS

The present invention relates to a method for producing a cationic electrodeposition coating composition, comprising mixing three components, i.e., an aqueous dispersion of an amino group-containing epoxy resin (A), an aqueous dispersion of a blocked polyisocyanate compound (B), and a pigment dispersion paste (C).

In the production method of the present invention, a blocked polyisocyanate compound, which is a curing agent, an amino group-containing epoxy resin, which is a base resin component that is to be reacted with the curing agent, and a pigment dispersion paste containing a pigment, a catalyst, and a resin for pigment dispersion are separately present in a coating composition (aqueous solvent), thus enabling the storage stability (bath stability) to be improved. The method of the present invention is especially effective for the storage stability of a low-temperature-baking composition that undergoes a curing reaction at 80 to 160° C. (preferably 100 to 130° C.).

The above components of the cationic electrodeposition coating composition, i.e., the aqueous dispersion (A), the aqueous dispersion (B), and the pigment dispersion paste (C), are present as mixed in a coating bath, which is used as a cationic electrodeposition coating composition. Two components may be mixed before being supplied to a coating bath (for example, the components (A) and (B), components (B) and (C), or components (A) and (C) may be mixed beforehand and supplied to a coating bath).

"Aqueous solvent" as used herein refers to a solvent containing water and/or a hydrophilic solvent as a main component (the main component is present in an amount of 50 mass % or more in the solvent). Specific examples of hydrophilic solvents include ethylene glycol, ethylene glycol monoalkyl ethers (such as methyl ether, ethyl ether, and butyl ether), diethylene glycol, diethylene glycol monoalkyl ethers (such as methyl ether, ethyl ether, and butyl ether), glyme solvents (such as ethylene glycol dimethyl ether), diglyme solvents (such as diethylene glycol dimethyl ether), alcohol solvents (such as methyl alcohol, ethyl alcohol, propyl alcohol, and n-butyl alcohol), propylene glycol, propylene glycol monoalkyl ethers (such as methyl ether, ethyl ether, and butyl ether), dipropylene glycol, dipropylene glycol monoalkyl ethers (such as methyl ether, ethyl ether, and butyl ether), and the like. These hydrophilic solvents can be used singly or in combination.

"Aqueous dispersion" as used herein refers to one in which a resin component is present in the form of particles in the aqueous solvent without dissolving.

The present invention is described in detail below.

Aqueous Dispersion of Amino Group-Containing Epoxy Resin (A)

The aqueous dispersion of an amino group-containing epoxy resin (A) that can be used in the present invention is a dispersion in which an amino group-containing epoxy resin (a), which is a main component, is dispersed in an aqueous solvent.

If necessary, the aqueous dispersion (A) may contain, for example, additives, such as neutralizing agents, emulsifiers, and catalysts, and other resin components, in addition to the amino group-containing epoxy resin (a).

The content of the amino group-containing epoxy resin (a) in the aqueous dispersion (A) is preferably 50 mass % or more, more preferably 70 mass % or more, and even more preferably 90 mass % or more, based on the solids content.

The method for dispersing the amino group-containing epoxy resin (a) in an aqueous solvent is preferably a method in which a solution of the amino group-containing epoxy resin (a) is neutralized with an acid compound and dispersed.

The acid compound is not particularly limited, and any known acid compounds can be used. Specific examples include inorganic acids, such as hydrochloric acid, nitric acid, phosphoric acid, and sulfamic acid; organic acids, such as formic acid, acetic acid, propionic acid, lactic acid, and like carboxylic acid compounds; and the like. These acid compounds can be used singly or in a combination of two or more. Of these, organic acids are preferable, and carboxylic acid compounds are particularly preferable.

Amino Group-Containing Epoxy Resin (a)

Examples of the amino group-containing epoxy resin (a), which is a constituent of the aqueous dispersion of the amino group-containing epoxy resin (A), include (1) adducts of an epoxy resin with primary mono- and polyamines, secondary mono- and polyamines, or primary and secondary mixed polyamines (see, for example, U.S. Pat. No. 3,984,299); (2) adducts of an epoxy resin with secondary mono- and polyamines containing a ketimine-blocked primary amino group (see, for example, U.S. Pat. No. 4,017,438); (3) reaction products obtained by etherifying an epoxy resin and a hydroxy compound containing a ketiminated primary amino group (see, for example, JPS59-043013A); and the like.

The epoxy resin used for producing the amino group-containing epoxy resin (a) is a compound having at least one epoxy group, and preferably two or more epoxy groups, per molecule. The molecular weight is preferably such that the epoxy resin has a number average molecular weight of at least 300, preferably 400 to 4,000, and more preferably 800 to 2,500; and has an epoxy equivalent of at least 160, preferably 180 to 2,500, and more preferably 400 to 1,500. Examples of such epoxy resins for use include those obtained by reacting a polyphenol compound with epihalohydrin (such as epichlorohydrin).

Examples of polyphenol compounds that can be used for forming the epoxy resin include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, and the like.

As the epoxy resin obtained by a reaction between a polyphenol compound and epihalohydrin, resins derived from bisphenol A and represented by the following formula oxide to introduce a polyalkylene oxide chain, (β) a method comprising reacting the polyphenol compound with polyalkylene oxide having at least one epoxy group, preferably two or more epoxy groups to introduce a polyalkylene oxide chain, or other like methods. Epoxy resins originally containing polyalkylene oxide chains may also be used (see, for example, JPH08-337750A).

The alkylene group in a polyalkylene oxide chain is preferably $C_{2-8}$ alkylene, more preferably ethylene, propylene, or butylene, and particularly preferably propylene.

The content of the polyalkylene oxide chain, as a constituent of polyalkylene oxide, is generally 1.0 to 15 mass %, preferably 2.0 to 9.5 mass %, and more preferably 3.0 to 8.0 mass %, based on the solids mass of the amino group-containing epoxy resin from the standpoint of improved coating composition stability, finished appearance, and corrosion resistance.

Examples of the primary mono- and polyamines, secondary mono- and polyamines, or primary and secondary mixed polyamines mentioned above in (1) as materials used for producing the amino group-containing epoxy resin (a) include mono- or dialkylamines, such as monomethylamine, dimethylamine, monoethylamine, diethylamine, monoisopropylamine, diisopropylamine, monobutylamine, and dibutylamine; alkanolamines, such as monoethanolamine, diethanolamine, mono(2-hydroxypropyl)amine, and monomethylaminoethanol; alkylene polyamines, such as ethylenediamine, propylenediamine, butylenediamine, hexamethylenediamine, diethylenetriamine, and triethylenetetramine; and the like.

Examples of the secondary mono- and polyamines containing a ketimine-blocked primary amino group mentioned above in (2) as materials used for producing the amino group-containing epoxy resin (a) include ketiminated products obtained by reacting a ketone compound with, for example, diethylenetriamine, among the primary and secondary mixed polyamines mentioned above in (1) as materials used for producing the amine-added epoxy resin.

Examples of the ketiminated primary amino group-containing hydroxy compound mentioned above in (3) as a material used for producing the amino group-containing epoxy resin (a) include hydroxy-containing ketiminated products obtained by reacting a ketone compound with a primary amino group- and hydroxy-containing compound, such as monoethanolamine or mono(2-hydroxypropyl) amine, among the primary mono- and polyamines, secondary mono- and polyamines, and primary and secondary

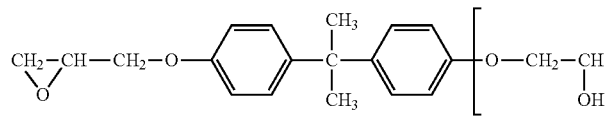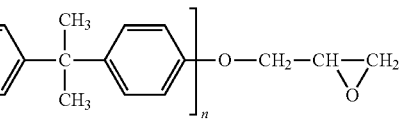

wherein n=0 to 8
are preferable.

Examples of commercially available products of the epoxy resin include products sold under the trade names of jER828EL, jER1002, jER1004, and jER1007 by Mitsubishi Chemical Corporation.

The epoxy resin for use may contain a polyalkylene oxide chain in the resin skeleton. Such epoxy resins can be obtained by (α) a method comprising reacting an epoxy resin having at least one epoxy group, preferably two or more epoxy groups with alkylene oxide or polyalkylene mixed polyamines, mentioned above in (1) as materials used for producing the amino group-containing epoxy resin (a).

The amine value of the amino group-containing epoxy resin (a) is preferably 10 to 100 mg KOH/g, and more preferably 30 to 80 mg KOH/g, based on the resin solids, from the standpoint of improved water dispersibility and corrosion resistance.

If necessary, the amino group-containing epoxy resin (a) may be modified with a modifier. The modifier is not particularly limited as long as it is a resin or compound that is reactive with an epoxy resin. Examples of usable modifiers include polyols, polyether polyols, polyester polyols, polyamidoamines, polycarboxylic acids, and fatty acids; polyisocyanate compounds and compounds obtained by reacting polyisocyanate compounds; lactone compounds such as ε-caprolactone; acrylic monomers and compounds obtained by polymerization reaction of acrylic monomers; xylene formaldehyde compounds; and epoxy compounds. These modifiers can be used singly or in a combination of two or more.

The amount of the modifier used is not strictly limited, and can be suitably changed, for example, according to the intended use of the coating composition. From the standpoint of improved finished appearance and corrosion resistance, it is suitable that the amount of the modifier is generally 0 to 50 mass %, preferably 0.1 to 30 mass %, and more preferably 1 to 20 mass %, based on the solids mass of the amino group-containing epoxy resin.

The addition reaction of the amine compound and modifier to the epoxy resin can generally be performed in a suitable solvent at a temperature of about 80 to 170° C., and preferably about 90 to 150° C. for about 1 to 6 hours, and preferably about 1 to 5 hours.

Examples of the solvent include hydrocarbon solvents such as toluene, xylene, cyclohexane, and n-hexane; ester solvents such as methyl acetate, ethyl acetate, and butyl acetate; ketone solvents such as acetone, methyl ethyl ketone, methyl isobutyl ketone, and methyl amyl ketone; amide compounds such as dimethylformamide and dimethylacetamide; alcohol solvents such as methanol, ethanol, n-propanol, and iso-propanol; ether alcohol compounds such as ethylene glycol monobutyl ether and diethylene glycol monoethyl ether; and mixtures thereof.

Aqueous Dispersion of Blocked Polyisocyanate Compound (B)

The aqueous dispersion of a blocked polyisocyanate compound (B) that can be used in the present invention is a dispersion in which a component containing a blocked polyisocyanate compound (b) is dispersed in an aqueous solvent. The blocked polyisocyanate compound (b) is obtained by reacting an isocyanate compound (b-1) with a blocking agent (b-2).

If necessary, the aqueous dispersion (B) may contain, for example, additives, such as neutralizing agents and emulsifiers, and other resin components, in addition to the polyisocyanate compound (b).

The content of the blocked polyisocyanate compound (b) in the aqueous dispersion (B) is preferably 50 mass % or more, more preferably 65 mass % or more, and even more preferably 80 mass % or more, based on the solids content.

The method for dispersing the blocked polyisocyanate compound (b) in an aqueous solvent is preferably a method using an emulsifier. The emulsifier is preferably a cationic emulsifier from the standpoint of cationic electrodeposition coating performance. Other than the cationic emulsifier, a nonionic emulsifier, an anionic emulsifier, an amphoteric emulsifier, etc., may also be used if necessary.

As the cationic emulsifier, a known cationic emulsifier can be used. Specific examples include resins having cationic functional groups, such as amine salt, ammonium salt, pyridinium salt, phosphonium salt, and sulfonium salt; and the like. These can be used singly or in a combination of two or more.

To ensure the dispersibility of the aqueous dispersion (B), the cationic functional group content is such that the amine value (mg KOH/g) is preferably about 20 to 300, and more preferably 30 to 200. A cationic functional group content such that the amine value (mg KOH/g) is less than 20 may result in poor dispersibility, and a cationic functional group content such that the amine value (mg KOH/g) is more than 300 may adversely affect, for example, the water resistance of the coating film.

The cationic emulsifier can be produced by imparting cationic functional group(s) to a resin main chain according to a known method. The resin skeleton of the cationic emulsifier is not particularly limited. Specific examples include epoxy resins, acrylic resins, liquid rubbers (elastomers), polyurethanes, polyethers, and modified resins and composite resins thereof, and the like. These can be used singly or in a combination of two or more.

The cationic emulsifier whose resin skeleton is an epoxy resin can be synthesized in the same manner as in the amino group-containing epoxy resin (a) described above.

The cationic emulsifier whose resin skeleton is an acrylic resin can be synthesized by, for example, a ring opening addition reaction of an acrylic copolymer containing glycidyl group(s) in the molecule with amine compound(s). Specifically, some or all of the glycidyl group(s) in a glycidyl group-containing acrylic resin obtained by copolymerizing glycidyl group-containing acrylic monomer(s), such as glycidyl(meth)acrylate, with other monomer(s) can be reacted with amine compound(s) to obtain a cationic acrylic resin.

The cationic emulsifier whose resin skeleton is an acrylic resin can also be obtained by copolymerizing amino group-containing acrylic monomer(s) with other monomer(s). Examples of amino group-containing acrylic monomers include N,N-dimethylaminoethyl (meth)acrylate, N,N-diethylaminoethyl(meth)acrylate, and the like.

Regarding the cationic emulsifier whose resin skeleton is a liquid rubber (elastomer), polyurethane, or polyether, cationic group(s) can be introduced by subjecting hydroxy groups, carboxy groups, epoxy groups, etc., at the molecular terminal(s) and/or in the molecular structure to an urethanization reaction or addition reaction with amine compound(s).

The content of the emulsifier is preferably 0.01 to 40 mass %, more preferably 0.1 to 30 mass %, and even more preferably 1 to 20 mass %, based on the resin solids content of the aqueous dispersion (B).

In addition, from the standpoint of storage stability, the content of active hydrogen groups in the emulsifier that are to be reacted with isocyanate groups in the polyisocyanate compound (b-1) is preferably low. The active hydrogen group content in the emulsifier is preferably 50 mol % or less, more preferably 0 to 30 mol %, and even more preferably 0 to 10 mol %, based on the isocyanate group content in the polyisocyanate compound (b-1).

Blocked Polyisocyanate Compound (b)

The blocked polyisocyanate compound (b), which is a constituent of the aqueous dispersion of the blocked polyisocyanate compound (B), is a product generated through an addition reaction of a polyisocyanate compound (b-1) with a blocking agent (b-2). If necessary, an active hydrogen-containing compound other than the blocking agent (b-2) may be used and reacted, together with the blocking agent (b-2), with the polyisocyanate compound (b-1) (in the present invention, a compound obtained by a reaction using an active hydrogen-containing compound other than the blocking agent (b-2) is, as a matter of course, also included in the "product generated through an addition reaction of a polyisocyanate compound (b-1) with a blocking agent (b-2)").

As the polyisocyanate compound (b-1), a known polyisocyanate compound can be used. Examples include tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI [polymethylene polyphenyl isocyanate], bis(isocyanatemethyl)cyclohexane, tetramethylene diisocyanate, hexamethylene diisocyanate, methylene diisocyanate, isophorone diisocyanate, and like aromatic, aliphatic, or alicyclic polyisocyanate compounds; cyclopolymers or biurets of these polyisocyanate compounds; and combinations thereof.

On the other hand, the blocking agent (b-2) is added to isocyanate groups of the polyisocyanate compound (b-1) to block the isocyanate groups. The blocked polyisocyanate compound (b) produced through the addition is stable at room temperature; however, when heated to the coating film baking temperature (for example, about 80 to 200° C.), the blocking agent preferably dissociates to regenerate free isocyanate groups.

Examples of the blocking agent (b-2) include methylethylketoxime, cyclohexanone oxime, and like oxime compounds; phenol, para-t-butylphenol, cresol, and like phenol compounds; n-butanol, 2-ethylhexanol, phenylcarbinol, methylphenylcarbinol, ethylene glycol monomethyl ether, ethylene glycol monoethyl ether, ethylene glycol monobutyl ether, diethylene glycol monoethyl ether, ethylene glycol, propylene glycol, propylene glycol monomethyl ether, methoxymethanol, and like alcohol compounds; ε-caprolactam, γ-butyrolactam, and like lactam compounds; dimethyl malonate, diethyl malonate, diisopropyl malonate, ethyl acetoacetate, isopropyl acetoacetate, methyl acetoacetate, isopropyl acetoacetate, acetylacetone, and like active methylene compounds; pyrazole, 3,5-dimethylpyrazole, 3-methylpyrazole, 4-bromo-3,5-dimethylpyrazole, 4-nitro-3,5-dimethylpyrazole, 4-benzyl-3,5-dimethylpyrazole, methyl-5-methylpyrazole-3-carboxylate, 3-methyl-5-phenylpyrazole, 3,5-dimethylpyrazole-4-carboxanilide, and like pyrazole compounds; butyl mercaptan, tert-butyl mercaptan, hexyl mercaptan, tert-dodecyl mercaptan, 2-mercaptobenzothiazole, thiophenol, methylthiophenol, ethylthiophenol, and like mercaptan compounds; acetanilide, acetanisidide, acetotoluide, acrylamide, methacrylamide, acetamide, stearamide, benzamide, and like acid amide compounds; succinimide, phthalimide, maleimide, and like imide compounds; diphenylamine, phenylnaphthylamine, xylidine, N-phenylxylidine, carbazole, aniline, naphthylamine, butylamine, dibutylamine, butylphenylamine, and like amine compounds; imidazole, 2-ethylimidazole, and like imidazole compounds; urea, thiourea, ethylene urea, ethylenethiourea, diphenylurea, and like urea compounds; phenyl N-phenylcarbamate and like carbamate compounds; ethyleneimine, propyleneimine, and like imine compounds; sodium bisulfite, potassium bisulfite, and like sulfite compounds; and the like. These can be used singly or in a combination of two or more.

Of these, at least one member selected from the group consisting of pyrazole compounds, active methylene compounds, oxime compounds, phenol compounds, lactam compounds, and alcohol compounds is preferable as the blocking agent (b-2) from the standpoint of low-temperature curability (dissociation temperature). Pyrazole compounds and/or active methylene compounds are more preferable, and pyrazole compounds are particularly preferable. As the pyrazole compound, 3,5-dimethylpyrazole and/or 3-methylpyrazole is preferable, and 3,5-dimethylpyrazole is more preferable.

Pigment Dispersion Paste (C)

The pigment dispersion paste (C) that can be used in the present invention comprises a coloring pigment, a rust-preventive pigment, an extender pigment, a curing catalyst, etc., that have been dispersed as fine particles in it. The pigment dispersion paste may be prepared, for example, by mixing additives, such as a resin for pigment dispersion, a pigment, and a neutralizing agent, and subjecting the mixture to dispersion treatment in a dispersing mixer, such as a ball mill, a sand mill, or a pebble mill.

Known resins may be used as the resin for pigment dispersion without any particular limitation. Examples of usable resins include epoxy resins having hydroxy and cationic groups, acrylic resins having hydroxy and cationic groups, tertiary amine-type epoxy resins, quaternary ammonium salt-type epoxy resins, tertiary sulfonium salt-type epoxy resins, tertiary amine-type acrylic resins, quaternary ammonium salt-type acrylic resins, tertiary sulfonium salt-type acrylic resins, and the like.

There is no particular limitation to the pigment, and known pigments can be used. Examples include coloring pigments, such as titanium oxide, carbon black, and colcothar; extender pigments, such as clay, mica, baryta, calcium carbonate, and silica; rust-preventive pigments; and the like.

To improve the curability of the coating film, an organic tin compound, such as dibutyltin dibenzoate, dioctyltin oxide, or dibutyltin oxide, may also be used as a catalyst. However, in view of recent environmental regulations on organic tin compounds, it is preferable that no organic tin compound be used.

In view of environmental considerations, it is further preferable that an inorganic compound such as a zinc compound, a bismuth compound, a titanium compound, a zirconium compound, or an yttrium compound; an organic compound, such as a phosphazene compound, an amine compound, or a quaternary salt compound; a composite thereof; or the like be used as an alternative catalyst for organic tin compounds, or that substantially no catalyst be used as an alternative catalyst for organic tin compounds.

When an organic compound is used for a curing catalyst in the cationic electrodeposition coating composition obtained by the production method of the present invention, the aqueous dispersion of the amino group-containing epoxy resin (A), other than the pigment dispersion paste (C), may contain the organic compound.

The amount of the pigment in the pigment dispersion paste (C) is preferably 1 to 100 parts by mass and particularly preferably 10 to 50 parts by mass, per 100 parts by mass of the resin solids content in the cationic electrodeposition coating composition.

Cationic Electrodeposition Coating Composition

In the cationic electrodeposition coating composition obtained by the production method of the present invention, the proportions of the amino group-containing epoxy resin (a) contained in the aqueous dispersion (A) and the blocked polyisocyanate curing agent (b) contained in the aqueous dispersion (B) are preferably such that the amount of the component (a) is 30 to 90 parts by mass, and preferably 40 to 85 parts by mass, and the amount of the component (b) is 10 to 70 parts by mass, and preferably 10 to 60 parts by mass, based on the total resin solids, mass of the components (a) and (b) to achieve excellent storage stability and obtain a coated article that is excellent in finished appearance and corrosion resistance. In addition, it is more preferable that the amine value of the entire resin contained in the coating composition be generally 20 to 150 mg KOH/g based on the resin solids content. Having proportions outside the above ranges may adversely affect the characteristics of the coating composition or coating film performance described above.

If necessary, the cationic electrodeposition coating composition may contain resins, such as acrylic resin, epoxy resin, urethane resin, and melamine resin; additives, such as surfactants, surface control agents, curing catalysts, and neutralizing agents; pigments; solvents; etc., in addition to the essential components, i.e., the aqueous dispersion of the amino group-containing epoxy resin (A), the aqueous dispersion of the blocked polyisocyanate compound (B), and the pigment dispersion paste (C).

Method for Forming Coating Film

The present invention provides a method for forming a cationic electrodeposition coating film comprising the steps of immersing a substrate in an electrodeposition bath comprising the cationic electrodeposition coating composition obtained by the production method described above, and applying a current using the substrate as a cathode.

Examples of substrates to which the cationic electrodeposition coating composition of the present invention is applied include automobile bodies, two-wheeled vehicles, home appliances, other appliances, and the like. The substrates are not particularly limited, as long as they contain metal.

Examples of metallic steel plates as substrates include cold-rolled steel plates, hot-dip galvanized steel plates, electro-galvanized steel plates, electrolytic zinc-iron duplex-plated steel plates, organic composite-plated steel plates, aluminium materials, magnesium materials, and the like. If necessary, these metal plates may be washed using alkali degreasing etc., and then subjected to surface treatment such as phosphate chemical conversion treatment, chromate treatment, or composite oxide treatment.

The cationic electrodeposition coating composition may be applied to a desired substrate surface by cationic electrodeposition coating. The cationic electrodeposition coating may be generally performed by using, as a bath, a cationic electrodeposition coating composition diluted with deionized water or the like to a solids content of about 5 to 40 mass %, and preferably 10 to 25 mass %, and adjusted to a pH of 4.0 to 9.0, and preferably 5.5 to 7.0. The temperature of the bath is generally adjusted to 15 to 35° C., and a current is applied at a load voltage of 100 to 400 V, and preferably 150 to 350 V, using the substrate as a cathode. In general, after performing electrodeposition coating, the coated substrate is fully washed with ultrafiltrate (UF filtrate), reverse osmosis water (RO water), industrial water, pure water, or the like, to remove the excess cationic electrodeposition coating composition adhering to the substrate.

The thickness of the electrodeposition coating film is not particularly limited, and can generally be in the range of 5 to 40 μm, and preferably 10 to 30 μm, based on the thickness of the dry coating film. The electrodeposition coating film is commonly bake-dried at a surface temperature of the coated article of higher than 160° C. but lower than 200° C. using a dryer, such as an electric hot-air dryer or a gas hot-air dryer. However, in the present invention, the bake drying is performed by heating the electrodeposition coating film at a surface temperature of the coated article of preferably lower than 160° C., more preferably 80 to 130° C., and particularly preferably 100 to 130° C., for 10 to 180 minutes, and preferably 20 to 50 minutes, from the standpoint of reducing energy cost. A cured coating film can be obtained by such bake drying.

EXAMPLES

The present invention is explained in detail below with reference to Production Examples, Examples, and Comparative Example; however, the present invention is not limited to these. In the Examples, "parts" and "%" are by mass.

Production of Amino Group-Containing Epoxy Resin

Production Example 1

1000 parts of jER828EL (trade name, epoxy resin produced by Japan Epoxy Resin Co., Ltd., epoxy equivalent: 190, number average molecular weight: 350), 400 parts of bisphenol A, and 0.2 parts of dimethylbenzylamine were placed in a flask equipped with a stirrer, a thermometer, a nitrogen inlet tube, and a reflux condenser, and the mixture was reacted at 130° C. until the epoxy equivalent became 750. Subsequently, 100 parts of ε-caprolactone and 0.05 parts of tetrabutoxy titanium were added, and the mixture was heated to 170° C. and reacted at 170° C. for 4 hours. 100 parts of Placcel 205 (trade name, produced by Daicel Corporation, polycaprolactone polyol compound), 140 parts of diethanolamine, and 65 parts of ketiminized product of diethylenetriamine obtained by reacting diethylenetriamine with methyl isobutyl ketone were then added thereto, and the mixture was reacted at 120° C. for 4 hours. Thereafter, 400 parts of ethylene glycol monobutyl ether was added to obtain an amino group-containing epoxy resin solution having a resin solids content of 80%. The obtained amino group-containing epoxy resin had an amine value of 56 mg KOH/g based the solids content.

Production of Aqueous Dispersion of Amino Group-Containing Epoxy Resin

Production Example 2

125 parts (solids content: 100 parts) of the amino group-containing epoxy resin with a resin solids content of 80% obtained in Production Example 1 and 8 parts of 10% formic acid were mixed. The mixture was uniformly stirred, and then deionized water was gradually added dropwise with vigorous stirring, thereby obtaining an aqueous dispersion of the amino group-containing epoxy resin having a solids content of 32.0%.

Production of Pigment Dispersion Paste

Production Example 3

1010 parts of jER828EL (produced by Japan Epoxy Resin Co., Ltd., trade name, epoxy resin), 390 parts of bisphenol A, 240 parts of Placcel 212 (polycaprolactonediol, produced by Daicel Corporation, trade name, weight average molecular weight: about 1,250), and 0.2 parts of dimethylbenzylamine were placed in a flask equipped with a stirrer, a thermometer, a dropping funnel, and a reflux condenser, and the mixture was reacted at 130° C. until the epoxy equivalent became about 1090. Subsequently, 134 parts of dimethylethanolamine and 150 parts of a 90% aqueous lactic acid solution were added, and the mixture was reacted at 120° C. for 4 hours. Methyl isobutyl ketone was then added to adjust the solids content, thereby obtaining an ammonium salt-type epoxy resin for pigment dispersion having a solids content of 60%.

Thereafter, 8.3 parts (solids content: 5 parts) of the resin for pigment dispersion described above, 14.5 parts of titanium oxide, 7.0 parts of purified clay, 0.3 parts of carbon black, 2 parts of bismuth hydroxide, and 20.3 parts of deionized water were added and dispersed using a ball mill for 20 hours, thereby obtaining a pigment dispersion paste No. 1 having a solids content of 55%.

Production Example 4

8.3 parts (solids content: 5 parts) of the resin for pigment dispersion obtained in Production Example 3, 14.5 parts of titanium oxide, 9.0 parts of purified clay, 0.3 parts of carbon black, and 20.3 parts of deionized water were added and dispersed using a ball mill for 20 hours, thereby obtaining a pigment dispersion paste No. 2 having a solids content of 55%.

Production Example 5

8.3 parts (solids content: 5 parts) of the resin for pigment dispersion obtained in Production Example 3, 14.5 parts of titanium oxide, 7.0 parts of purified clay, 0.3 parts of carbon black, 2 parts of dioctyltin oxide, and 20.3 parts of deionized water were added and dispersed using a ball mill for 20 hours, thereby obtaining a pigment dispersion paste No. 3 having a solids content of 55%.

Production of Blocked Polyisocyanate Compound

Production Example 6

250 parts of Sumidur N3300 (trade name, produced by Sumika Bayer Urethane Co., Ltd., polyisocyanate having a hexamethylene diisocyanate-derived isocyanurate structure) and 125 parts of methyl ethyl ketone were placed in a four-necked flask equipped with a stirrer, a heating device, a cooling device, and a pressure reducing device, and the mixture was heated to 30° C. Subsequently, 126 parts of 3,5-dimethylpyrazole was gradually added over a period of 2 hours with stirring, and the reaction mixture was reacted at 30° C. under stirring until no free isocyanate groups were detected by infrared spectroscopy. Further, methyl isobutyl ketone was added to obtain a blocked polyisocyanate compound No. 1 having a solids content of 70%. The obtained pyrazole-blocked polyisocyanate compound had an NCO content of 14.4%.

As used herein, the NCO content means the content (%) of NCO groups per 100 parts by mass of the resin solids content.

Production Example 7

200 parts of Sumidur N-3300 (trade name, produced by Sumika Bayer Urethane Co., Ltd., polyisocyanate having a hexamethylene diisocyanate-derived isocyanurate structure), 100 parts of methyl ethyl ketone, and 196 parts of diisopropyl malonate were placed in a four-necked flask equipped with a stirrer, a heating device, a cooling device, and a pressure reducing device. While the mixture was stirred in a nitrogen stream, 1.6 parts of a 28% methanol solution of sodium methoxide was added, and the mixture was stirred at 65° C. for 8 hours. Further, methyl isobutyl ketone was added to obtain a blocked polyisocyanate compound No. 2 having a solids content of 70%. The obtained blocked polyisocyanate compound had an NCO content of 11.0%.

Production Example 8

272 parts of hexamethylene diisocyanate and 214 parts of methyl ethyl ketone were placed in a four-necked flask equipped with a stirrer, a heating device, a cooling device, and a pressure reducing device, and the mixture was heated to 60° C. Subsequently, 169 parts of methylethylketoxime was gradually added over a period of time 1 hour with stirring. Thereafter, the mixture was reacted at 60° C. for 2 hours, and then 59 parts of trimethylolpropane was gradually added such that the temperature remained under 70° C. The reaction mixture was reacted at 60° C. under stirring until no free isocyanate groups were detected by infrared spectroscopy. After completion of the reaction, a blocked polyisocyanate compound No. 3 having a solids content of 70% was obtained. The obtained blocked polyisocyanate compound had an NCO content of 16.4%.

Production Example 9

270 parts of Cosmonate M-200 (trade name, produced by Mitsui Chemicals, Inc., crude MDI) and 127 parts of methyl isobutyl ketone were placed in a four-necked flask equipped with a stirrer, a heating device, a cooling device, and a pressure reducing device, and the mixture was heated to 70° C. 236 parts of ethylene glycol monobutyl ether was added dropwise thereto over a period of 1 hour, and the mixture was then heated to 100° C. While maintaining this temperature, the mixture was sampled over time. When no absorption by unreacted isocyanate groups was observed by infrared absorption spectrometry, methyl isobutyl ketone was further added, thereby obtaining a blocked polyisocyanate compound No. 4 having a solids content of 70%. The obtained blocked polyisocyanate compound had an NCO content of 16.7%.

Production Example 10

250 parts of Sumidur N3300 (trade name, produced by Sumika Bayer Urethane Co., Ltd., polyisocyanate having a hexamethylene diisocyanate-derived isocyanurate structure), 125 parts of methyl ethyl ketone, and 2.7 parts of trimethylolpropane were placed in a four-necked flask equipped with a stirrer, a heating device, a cooling device, and a pressure reducing device, and the mixture was reacted at 70° C. for 2 hours. Subsequently, 120 parts of 3,5-dimethylpyrazole was gradually added over a period of 2 hours with stirring, and the reaction mixture was reacted at 30° C. under stirring until no free isocyanate groups were detected by infrared spectroscopy. Further, methyl isobutyl ketone was added to obtain a blocked polyisocyanate compound No. 5 having a solids content of 70%. The obtained pyrazole-blocked polyisocyanate compound had an NCO content of 13.9%.

Production Example 11

250 parts of Sumidur N3300 (trade name, produced by Sumika Bayer Urethane Co., Ltd., polyisocyanate having a hexamethylene diisocyanate-derived isocyanurate structure), 125 parts of methyl ethyl ketone, and 20 parts of PEG-1000 (produced by Sanyo Chemical Industries, Ltd., polyethylene glycol) were placed in a four-necked flask equipped with a stirrer, a heating device, a cooling device, and a pressure reducing device, and the mixture was reacted at 70° C. for 2 hours. Subsequently, 122.5 parts of 3,5-dimethylpyrazole was gradually added over a period of 2 hours with stirring, and the reaction mixture was reacted at 30° C. under stirring until no free isocyanate groups were detected by infrared spectroscopy. Further, methyl isobutyl ketone was added to obtain a blocked polyisocyanate compound No. 6 having a solids content of 70%. The obtained pyrazole-blocked polyisocyanate compound had an NCO content of 13.4%.

Production of Cationic Emulsifier

Production Example 12

A mixed solvent comprising 30 parts of methoxypropanol and 30 parts of isobutanol was placed in a reaction vessel equipped with a thermometer, a thermostat, a stirrer, a reflux condenser, a nitrogen inlet tube, and a dropping funnel, and heated to 110° C. A mixture comprising 20 parts of ethyl acrylate, 50 parts of n-butyl acrylate, 30 parts of N,N-dimethylaminoethyl methacrylate, 10 parts of isobutanol, and 4 parts of t-butyl peroxyoctanoate was added to the mixed solvent above over a period of 4 hours. Further, a mixture comprising 0.5 parts of t-butyl peroxyoctanoate and 10 parts of isobutanol was added dropwise for 1 hour. Subsequently, the mixture was aged for 1 hour with stirring, and 40 parts of 10% formic acid was then added to obtain a cationic emulsifier No. 1 having a solids concentration of 50%. The obtained cationic emulsifier had an amine value of 107 mg KOH/g, a hydroxy value of 0 mg KOH/g, an active hydrogen value (in terms of amine value) of 0 mg KOH/g, and a weight average molecular weight of 10,000.

Production Example 13

A mixed solvent comprising 30 parts of methoxypropanol and 30 parts of isobutanol was placed in a reaction vessel equipped with a thermometer, a thermostat, a stirrer, a reflux condenser, a nitrogen inlet tube, and a dropping funnel, and heated to 110° C. A mixture comprising 30 parts of n-butyl acrylate, 30 parts of N,N-dimethylaminoethyl methacrylate, 40 parts of 2-hydroxyethyl acrylate, 10 parts of isobutanol, and 4 parts of t-butyl peroxyoctanoate was added to the mixed solvent above over a period of 4 hours. Further, a mixture comprising 0.5 parts of t-butyl peroxyoctanoate and 10 parts of isobutanol was added dropwise for 1 hour. Subsequently, the mixture was aged for 1 hour with stirring, and 40 parts of 10% formic acid was added to obtain a cationic emulsifier No. 2 having a solids concentration of 50%. The obtained cationic emulsifier had an amine value of 107 mg KOH/g, a hydroxy value of 194 mg KOH/g, an active hydrogen value (in terms of amine value) of 194 mg KOH/g, and a weight average molecular weight of 10,000.

Production Example 14

608 parts of jER828EL (trade name, epoxy resin produced by Japan Epoxy Resin Co., Ltd., epoxy equivalent: 190, number average molecular weight: 350), 137 parts of bisphenol A, and 0.2 parts of dimethylbenzylamine were placed in a flask equipped with a stirrer, a thermometer, a nitrogen inlet tube, and a reflux condenser, and the mixture was reacted at 130° C. until the epoxy equivalent became 370. Subsequently, 126 parts of diethanolamine and 160 parts of a ketiminized product of diethylenetriamine obtained by reacting diethylenetriamine with methyl isobutyl ketone were added, and the mixture was reacted at 120° C. for 4 hours. Thereafter, 370 parts of 10% formic acid and ethylene glycol monobutyl ether were added to obtain a cationic emulsifier No. 3 solution having a solids content of 80%. The obtained cationic emulsifier had an amine value of 180 mg KOH/g and an active hydrogen value (in terms of amine value) of 397 mg KOH/g based the solids content.

Production Example 15

608 parts of jER828EL (trade name, epoxy resin produced by Japan Epoxy Resin Co., Ltd., epoxy equivalent: 190, number average molecular weight: 350), 137 parts of bisphenol A, and 0.2 parts of dimethylbenzylamine were placed in a flask equipped with a stirrer, a thermometer, a nitrogen inlet tube, and a reflux condenser, and the mixture was reacted at 130° C. until the epoxy equivalent became 370. Subsequently, 135 parts of monomethylethanolamine was added, and the mixture was reacted at 120° C. for 4 hours. Thereafter, 350 parts of 10% formic acid and ethylene glycol monobutyl ether were added to obtain a cationic emulsifier No. 4 solution having a solids content of 80%. The obtained cationic emulsifier had an amine value of 115 mg KOH/g and an active hydrogen value (in terms of amine value) of 306 mg KOH/g based the solids content.

Production Example 16

608 parts of jER828EL (trade name, epoxy resin produced by Japan Epoxy Resin Co., Ltd., epoxy equivalent: 190, number average molecular weight: 350), 137 parts of bisphenol A, and 0.2 parts of dimethylbenzylamine were placed in a flask equipped with a stirrer, a thermometer, a nitrogen inlet tube, and a reflux condenser, and the mixture was reacted at 130° C. until the epoxy equivalent became 370. Subsequently, 81 parts of dimethylamine was added, and the mixture was reacted at 120° C. for 4 hours. Thereafter, 330 parts of 10% formic acid and ethylene glycol monobutyl ether were added to obtain a cationic emulsifier No. 5 solution having a solids content of 80%. The obtained cationic emulsifier had an amine value of 122 mg KOH/g and an active hydrogen value (in terms of amine value) of 204 mg KOH/g based the solids content.

Production of Cationic Electrodeposition Coating Composition

Example 1

42.9 parts (solids content: 30 parts) of the blocked polyisocyanate compound No. 1 obtained in Production Example 6 and 15 parts (solids content: 7.5 parts) of the cationic emulsifier No. 1 obtained in Production Example 12 were mixed, and the mixture was uniformly stirred. Thereafter, deionized water was gradually added dropwise with vigorous stirring to obtain an aqueous dispersion of a blocked polyisocyanate compound (B) having a solids content of 32.0%.

Subsequently, to the aqueous dispersion, 218.8 parts (solids content: 70 parts) of the aqueous dispersion of the amino group-containing epoxy resin obtained in Production Example 2, 52.4 parts (solids content: 28.8 parts) of the pigment dispersion paste No. 1 with a solids content of 55% obtained in Production Example 3, and pure water were gradually added with stirring to obtain a cationic electrodeposition coating composition X-1 having a solids content of 20%.

Examples 2 to 14

Cationic electrodeposition coating compositions X-2 to X-14 were produced in the same manner as in Example 1, except that the components of the cationic electrodeposition coating composition X-1 of Example 1 and their amounts were changed as shown in. Table 1 below. The amounts in Table 1 are values of active ingredients or solids contents.

Comparative Example 1

87.5 parts (solids content: 70 parts) of the amino group-containing epoxy resin obtained in Production Example 1 and 42.9 parts (solids content: 30 parts) of the blocked polyisocyanate compound No. 1 obtained in Production Example 6 were mixed, and 13 parts of 10% acetic acid was further added. After the mixture was uniformly stirred, deionized water was gradually added dropwise with vigorous stirring to obtain an emulsion having a solids content of 34%.

Subsequently, 294 parts (solids content: 100 parts) of the emulsion, 52.4 parts (solids content: 28.8 parts) of the pigment dispersion paste No. 1 with a solids content of 55% obtained in Production Example 3, and 350 parts of deionized water were added to obtain a cationic electrodeposition coating composition X-15 having a solids content of 20%.

In addition, evaluation tests were performed for finished appearance, corrosion resistance, and gel fraction according to the procedures described below. Table 1 shows the results. If even one of the three evaluation tests results in a rating of "D", the coating composition is considered to be a failure.

TABLE 1

| | | | Example/Comparative Example Example | | | | | | | |
|---|---|---|---|---|---|---|---|---|---|---|
| | | | 1 | 2 | 3 | 4 | 5 | 6 | 7 | 8 |
| Cationic electrodeposition coating composition name | | | X-1 | X-2 | X-3 | X-4 | X-5 | X-6 | X-7 | X-8 |
| (A) | Aqueous dispersion of amino group-containing epoxy resin | | 70 | 70 | 70 | 70 | 70 | 70 | 70 | 70 |
| Aqueous dispersion (B) | Blocked polyisocyanate compound | No. 1 | 30 | 30 | 30 | 30 | 30 | | | |
| | | No. 2 | | | | | | 30 | | |
| | | No. 3 | | | | | | | 30 | |
| | | No. 4 | | | | | | | | 30 |
| | | No. 5 | | | | | | | | |
| | | No. 6 | | | | | | | | |
| | Emulsifier Cationic emulsifier | No. 1 | 7.5 | | | | | 7.5 | 7.5 | 7.5 |
| | | No. 2 | | 7.5 | | | | | | |
| | | No. 3 | | | | 7.5 | | | | |
| | | No. 4 | | | | | 7.5 | | | |
| | | No. 5 | | | 7.5 | | | | | |
| | Nonionic emulsifier | Noigen EA-167 (Note 1) | | | | | | | | |
| | Active hydrogen group content (mol %) in emulsifier (Note 2) | | 0 | 25 | 27 | 40 | 52 | 0 | 0 | 0 |
| (C) | Pigment dispersion paste No. 1 | | 28.8 | 28.8 | 28.8 | 28.8 | 28.8 | 28.8 | 28.8 | 28.8 |
| | Pigment dispersion paste No. 2 | | | | | | | | | |
| | Pigment dispersion paste No. 3 | | | | | | | | | |
| Evaluation | Finished appearance | Before storage test | A | A | A | A | A | A | A | A |
| | | After storage test | A | B | B | B | C | A | A | A |
| | Corrosion resistance | Before storage test | A | A | A | A | A | B | B | C |
| | | After storage test | A | B | B | C | C | B | B | C |
| | Gel fraction | | A | A | A | A | A | B | C | C |

| | | | Example/Comparative Example Example | | | | | | Comparative Example |
|---|---|---|---|---|---|---|---|---|---|
| | | | 9 | 10 | 11 | 12 | 13 | 14 | 1 |
| Cationic electrodeposition coating composition name | | | X-9 | X-10 | X-11 | X-12 | X-13 | X-14 | X-15 |
| (A) | Aqueous dispersion of amino group-containing epoxy resin | | 70 | 70 | 70 | 70 | 70 | 70 | 70 |
| Aqueous dispersion (B) | Blocked polyisocyanate compound | No. 1 | 30 | | | 30 | 30 | 30 | 30 |
| | | No. 2 | | | | | | | |
| | | No. 3 | | | | | | | |
| | | No. 4 | | | | | | | |
| | | No. 5 | | 30 | | | | | |
| | | No. 6 | | | 30 | | | | |
| | Emulsifier Cationic emulsifier | No. 1 | | | 7.5 | 7.5 | 5 | 7.5 | 7.5 | Not contained |
| | | No. 2 | | | | | | | |
| | | No. 3 | | | | | | | |
| | | No. 4 | | | | | | | |
| | | No. 5 | | | | | | | |
| | Nonionic emulsifier | Noigen EA-167 (Note 1) | 7.5 | | | 2.5 | | | |
| | Active hydrogen group content (mol %) in emulsifier (Note 2) | | 0 | 0 | 0 | 0 | 0 | 0 | |
| (C) | Pigment dispersion paste No. 1 | | 28.8 | 28.8 | 28.8 | 28.8 | | | 28.8 |
| | Pigment dispersion paste No. 2 | | | | | | 28.8 | | |
| | Pigment dispersion paste No. 3 | | | | | | | 28.8 | |

TABLE 1-continued

| Evaluation | Finished appearance | Before storage test | C | A | A | B | A | A | A |
|---|---|---|---|---|---|---|---|---|---|
| | | After storage test | C | A | A | B | A | A | D |
| | Corrosion resistance | Before storage test | C | A | A | B | B | A | A |
| | | After storage test | C | A | A | B | B | A | D |
| | Gel fraction | | A | A | A | A | B | A | A |

The coating composition of Comparative Example 1 was produced by a conventional method in which the amino group-containing epoxy resin and the blocked polyisocyanate compound were mixed, and the mixture was dispersed in water and then mixed with the pigment dispersion paste.
Note 1:
Noigen EA-167: trade name, produced by DKS Co. Ltd., nonionic emulsifier (polyoxyethylene alkyl styrenated ether)
Note 2:
active hydrogen group content (mol %) in the emulsifier based on the isocyanate group content in the polyisocyanate compound (b-1)

Evaluation Tests
Gel Fraction

Each of the cationic electrodeposition coating compositions obtained in the Examples and Comparative Example was individually applied to metal plates by electrodeposition to provide a film thickness after cure of 2.0 μm, and the resulting films were heated at a temperature of 120° C. for 30 minutes. The mass of each coating film (Wa) was then measured. Each metal plate was individually placed in separate-type round bottom flasks, and acetone was added in an amount of 100 g per gram of each coating film, followed by heating under reflux for 5 hours. The removed coating films were dried at 110° C. for 1 hour, and the mass of each coating film (Wb) was measured. The gel fraction was calculated according to the following equation.

$$\text{Gel fraction (\%)} = (Wb/Wa) \times 100$$

Evaluation was performed according to the following criteria. A to C are pass, and D is fail.
A: The gel fraction is not less than 90%.
B: The gel fraction is not less than 80% but less than 90%.
C: The gel fraction is not less than 70% but less than 80%.
D: The gel fraction is less than 70%.
Preparation of Test Plates (Before and After Storage Test)

Cold-rolled steel plates (150 mm (length)×70 mm (width)×0.8 mm (thickness)) subjected to chemical conversion treatment with Palbond #3020 (trade name, produced by Nihon Parkerizing Co., Ltd., zinc phosphate treating agent) were used as substrates, and the cationic electrodeposition coating compositions obtained in the Examples and Comparative Example were applied to the plates by electrodeposition to a dry film thickness of 17 μm. The resulting films were bake-dried at 120° C. for 30 minutes to obtain test plates (before storage test).

Subsequently, 3500 g of each of the cationic electrodeposition coating compositions obtained in the Examples and Comparative Example was individually placed in cylindrical sealed containers (20 cm (diameter)×15 cm (height)) shown in FIG. 1 and stored at 30° C. for 30 days while being stirred (with a stirring blade (8 cm (width)×3 cm (height)) at a rotation speed of 700 rpm).

The cationic electrodeposition coating compositions after the storage test were applied to a dry film thickness of 17 μm by electrodeposition, and the resulting films were bake-dried at 120° C. for 30 minutes to obtain test plates (after storage test).

Finished Appearance

Surface roughness (Ra) of the coating surface of each test plate was measured at a cut-off value of 0.8 mm with a Surf Test 301 (trade name, produced by Mitutoyo Corporation, surface roughness tester), and evaluated according to the following criteria. In the evaluation, A to C are pass, and D is fail.

A: The surface roughness (Ra) is less than 0.2.
B: The surface roughness (Ra) is not less than 0.2 but less than 0.25.
C: The surface roughness (Ra) is not less than 0.25 but less than 0.3.
D: The surface roughness (Ra) is not less than 0.3.
Corrosion Resistance The coating films were cross-cut with a knife so that the cut reached the substrate of the test plates. The test plates were then subjected to a salt spray test at 35° C. for 840 hours in accordance with JIS Z-2371. Corrosion resistance was evaluated based on the width of rust and blistering from the cut on one side according to the following criteria. In the evaluation, A to C are pass, and D is fail.
A: The maximum width of rust and blistering from the cut on one side is not more than 2.0 mm.
B: The maximum width of rust and blistering from the cut on one side is more than 2.0 mm but not more than 2.8 mm.
C: The maximum width of rust and blistering from the cut on one side is more than 2.8 mm but not more than 3.5 mm.
D: The maximum width of rust and blistering from the cut on one side is more than 3.5 mm.

The invention claimed is:

1. A method for producing a cationic electrodeposition coating composition, comprising mixing an aqueous dispersion of an amino group-containing epoxy resin (A), an aqueous dispersion of a blocked polyisocyanate compound (B), and a pigment dispersion paste (C), wherein the aqueous dispersion of the blocked polyisocyanate compound (B) comprises a blocked polyisocyanate compound (b) and an emulsifier.

2. The method for producing a cationic electrodeposition coating composition according to claim 1, wherein the emulsifier is present in an amount of 0.01 to 40 mass % based on the resin solids content of the aqueous dispersion (B).

3. The method for producing a cationic electrodeposition coating composition according to claim 2, wherein the emulsifier is a cationic emulsifier.

4. The method for producing a cationic electrodeposition coating composition according to claim 2, wherein the blocked polyisocyanate compound (b) is obtained by reacting an isocyanate compound (b-1) with a blocking agent (b-2), and wherein the emulsifier has an active hydrogen group content of 50 mol % or less based on the isocyanate group content in the polyisocyanate compound (b-1).

5. The method for producing a cationic electrodeposition coating composition according to claim 1, wherein the blocked polyisocyanate compound (b) is obtained by reacting an isocyanate compound (b-1) with a blocking agent (b-2), and wherein the blocking agent (b-2) is at least one member selected from the group consisting of pyrazole compounds, active methylene compounds, oxime compounds, phenol compounds, lactam compounds, and alcohol compounds.

6. The method for producing a cationic electrodeposition coating composition according to claim 1, wherein a gel fraction using the cationic electrodeposition coating composition produced by the method is 90% or more, wherein the gel fraction is measured as follows:
- the cationic electrodeposition coating composition is applied to a metal plate by electrodeposition to provide a film thickness after cure of 20 μm, and a resulting film is heated at 120° C. for 30 minutes to obtain a cured coating film (Wa);
- the mass of the cured coating film (Wa) is measured;
- the cured coating film (Wa) is immersed in acetone and heated under reflux for 5 hours;
- after the immersion in acetone, the coating film (Wa) is dried at 110° C. for 1 hour to obtain a coating film (Wb), and the mass of the coating film (Wb) is measured; and
- the gel fraction is determined according to the following equation:

$$\text{Gel fraction (\%)} = (Wb/Wa) \times 100.$$

7. A method for forming a coating film, comprising applying the cationic electrodeposition coating composition obtained by the method according to claim 1 to a metal substrate by electrodeposition to form a coating film and baking the film at a temperature of 160° C. or less.

8. A method for forming a coating film, comprising applying the cationic electrodeposition coating composition obtained by the method according to claim 1 to a metal substrate by electrodeposition to form a coating film and baking the film at a temperature of 80 to 130° C.

* * * * *